No. 766,892. PATENTED AUG. 9, 1904.
J. M. OLINGER.
COMBINED FERTILIZER DISTRIBUTER AND GRAIN DRILL.
APPLICATION FILED JUNE 11, 1904.
NO MODEL.

Witnesses
G. Howard Walmsley.
Irvine Miller.

Inventor
Jacob M. Olinger;
By H. A. Toulmin,
Attorney

No. 766,892. Patented August 9, 1904.

UNITED STATES PATENT OFFICE.

JACOB M. OLINGER, OF VIENNA CROSSROADS, OHIO.

COMBINED FERTILIZER-DISTRIBUTER AND GRAIN-DRILL.

SPECIFICATION forming part of Letters Patent No. 766,892, dated August 9, 1904.

Application filed June 11, 1904. Serial No. 212,181. (No model.)

*To all whom it may concern:*

Be it known that I, JACOB M. OLINGER, a citizen of the United States, residing at Vienna Crossroads, in the county of Clark and State of Ohio, have invented certain new and useful Improvements in a Combined Fertilizer-Distributer and Grain-Drill, of which the following is a specification, reference being had therein to the accompanying drawings.

This invention relates to combined fertilizer-distributers and grain-drills, and has for its object to provide a construction whereby water may be prevented from entering the fertilizer-compartment and wetting the fertilizer, thereby rendering its feeding or distribution difficult or impossible. Fertilizer grain-drills in which fertilizer is deposited in the furrows along with the grain are constructed with a hopper or box, usually of wood except as to its end portions, which are generally of metal, said hopper being divided into a grain-compartment and a fertilizer-compartment, each closed by a hinged lid or cover at the top. The joint between the meeting edges of the top of the hopper and the hinged cover or lid of the fertilizer-compartment is frequently sufficiently open to permit the passage of water or become so in time through wear or through shrinking or warping of the parts when made of wood. It is not always convenient or possible to provide a shelter for the drill in the intervals between its use, and it frequently occurs that a drill thus unprotected, with its hopper filled or partly filled with fertilizer, is exposed to rain, which, finding its way through the joint between the cover and top of the fertilizer-compartment, wets the fertilizer and causes it to become so sticky as to prevent its feeding through the distributers, thus necessitating the cleaning out of the fertilizer-compartment and the distributers and the loss of the fertilizer.

It is the object of my present invention to prevent water which may pass through the joint between the cover and top from having access to the fertilizer, the water being carried away and discharged clear of the hopper, and the means for accomplishing this end being located within the hopper, leaving the top of the hopper smooth and in the ordinary or usual condition, while the device is so arranged that it will not become clogged during the filling of the fertilizer-compartment and will also effectually prevent the water from following the surfaces of the hopper, and thus reaching the fertilizer.

To these ends my invention consists in certain novel features, which I will now proceed to describe and will then particularly point out in the claims.

In the accompanying drawings, Figure 1 is a plan view of a fertilizer-grain-drill hopper embodying my invention in one form, a portion thereof being in broken section to show the construction. Fig. 2 is an end elevation. Fig. 3 is a sectional view taken on the line $x\,x$ of Fig. 1 and looking in the direction of the arrows. Fig. 4 is a detail view, in vertical section, through one end of the hopper and the trough or conduit, taken on the line $y\,y$ of Fig. 2 and looking in the direction of the arrows. Fig. 5 is a detail sectional view illustrating a modification of the rib at the edge of the top, and Fig. 6 is a detail view of a modification of the trough end.

In the said drawings, 1 indicates the hopper as a whole, comprising the bottom 2, front and rear walls 3, and end walls 4. The interior of the hopper is divided by a partition 5 into a grain-compartment 6 and a fertilizer-compartment 7. The top of the hopper is provided with a closure comprising a fixed portion 8, which for convenience of reference I will term the "top," and covers or lids 9 and 10, hinged to said fixed portion by hinges 11 and covering, respectively, the grain-compartment and the fertilizer-compartment. All of these parts may be of any approved construction.

12 indicates a trough or conduit open at its top and secured to the under side of the cover 10 of the fertilizer-compartment near the upper or hinged edge thereof, the said cover being preferably rabbeted, as indicated at 13, to receive the flange or extension of said trough, by means of which it is secured to said cover, so that the under surface of the trough lies flush with the under surface of the cover. Said trough is of a width sufficient to extend under and across the joint between the cover 10 and top 8, its free edge lying underneath said top, and is of a length sufficient to extend the entire length of the fertilizer-compartment and beyond the same through and past the outer surfaces of the end walls 4 of the hopper. These end walls are provided with openings 14, through which the ends of the trough 12 may freely pass. When the top and cover extend beyond the outer surface of the end walls, as is usually the case, the trough preferably terminates somewhat short of the ends of said top and cover, so as to be protected thereby. The top 8 is preferably rabbeted or cut away at its under side, as indicated at 15, to receive the free end of the trough, and its margin adjacent to the cover 10 is provided on its under side with a downwardly-extending projection or rib 16, which lies over the open mouth of the trough 12. The trough is provided at each end with a downwardly-extending lip or projection 17.

It will be seen that in case the joint between the meeting edges of the top 8 and cover 10 is or becomes sufficiently open to permit the passage of water the trough 12 will receive the water and conduct it to one end or the other of the hopper, preventing it from having access to the fertilizer and discharging it at a point clear of the end wall of the hopper. Any water which may tend to follow the under surface of the cover 10 will of course be received in the trough, while the rib 16 will effectually prevent the water from following the under surface of the cover 8 and will cause it to drip or be discharged from said rib directly into the trough. The lips 17 effectually prevent the water from following back along the under side of the trough and dripping thence onto the fertilizer. Moreover, the trough is attached to the cover, so that when the cover is swung up to permit the compartment 7 to be filled the trough presents its concave side to the fertilizer, and therefore cannot become filled or clogged therewith, since the fertilizer cannot enter said trough while the compartment is being filled. It will therefore be seen that the implement may be left exposed at the close of the day's work or at other times with fertilizer in the appropriate compartment of the hopper without any danger of rain having access to and spoiling the fertilizer for feeding purposes. The slightest inclination of the hopper toward one end or the other will drain the water from the trough toward the lower end thereof, and since in ordinary use the implement never stands exactly level a sufficient discharge for the water is always provided.

It is obvious that various modifications in the details of construction may be made without departing from the principle of my invention. For instance, I have shown in Fig. 5 a modified form of the top, here indicated by the reference-numeral 18, in which the rabbet in the under side of the top is provided with an inclined wall 19, extending downward toward the edge of the top, where it joins the cover, thus forming, in effect and function, an equivalent of the rib or projection 16, since the portion included between the inclined wall 19 and the vertical face 20 of the top forms, in effect, a drip projection 21, similar to the drip projection 16. Instead of employing the lips 17 as drip projections at the ends of the trough the same result may be accomplished by inclining said ends downward and outward, as indicated at 22 in Fig. 6 of the drawings.

Other modifications will readily suggest themselves to those skilled in the art, and I therefore do not wish to be understood as limiting myself to the precise details of construction hereinbefore described, and shown in the accompanying drawings.

Having thus fully described my invention, what I claim as new, and desire to secure by Letters Patent, is—

1. In a fertilizer grain-drill, a hopper provided with a fertilizer-compartment, a top extending over said compartment, and a cover for said compartment hinged to said top, in combination with a trough located below the meeting edges of said top and cover and extending beyond the ends of the compartment, substantially as described.

2. In a fertilizer grain-drill, a hopper provided with a fertilizer-compartment, a top extending over said compartment, and a cover for said compartment hinged to said top, in combination with a trough located below the meeting edges of said top and cover and extending beyond the ends of the compartment, its discharge extremities being provided with means for preventing the water from following the under side of the trough, substantially as described.

3. In a fertilizer grain-drill, a hopper provided with a fertilizer-compartment, a top extending over said compartment, and a cover for said compartment hinged to said top, in combination, with a trough located below the meeting edges of said top and cover and extending beyond the ends of the compartment, the discharge extremities of said trough being provided with downwardly-extending projections, substantially as described.

4. In a fertilizer grain-drill, a hopper provided with a fertilizer-compartment, a top extending over said compartment, and a cover for said compartment hinged to said top, in combination with a trough located below the meeting edges of said top and cover, secured to the top, and extending beyond the ends of the compartment, substantially as described.

5. In a fertilizer grain-drill, a hopper provided with a fertilizer-compartment, a top extending over said compartment and a cover for said compartment hinged to said top, in combination with a trough located below the meeting edges of said top and cover, secured to said cover, and extending beyond the ends of the compartment, the top being provided on its under side with a drip projection located above said trough, substantially as described.

6. In a fertilizer grain-drill, a hopper provided with a fertilizer-compartment, a top extending over said compartment and a cover for said compartment hinged to said top, in combination with a trough located below the meeting edges of said top and cover, secured to said cover, and extending beyond the ends of the compartment, the top being provided on its under side with a drip projection located above said trough, and the trough being provided at its discharge extremities with means for preventing the water from following the under side of said trough, substantially as described.

In testimony whereof I affix my signature in presence of two witnesses.

JACOB M. OLINGER.

Witnesses:
IRVINE MILLER,
GERTRUDE D. YOUNG.